UNITED STATES PATENT OFFICE

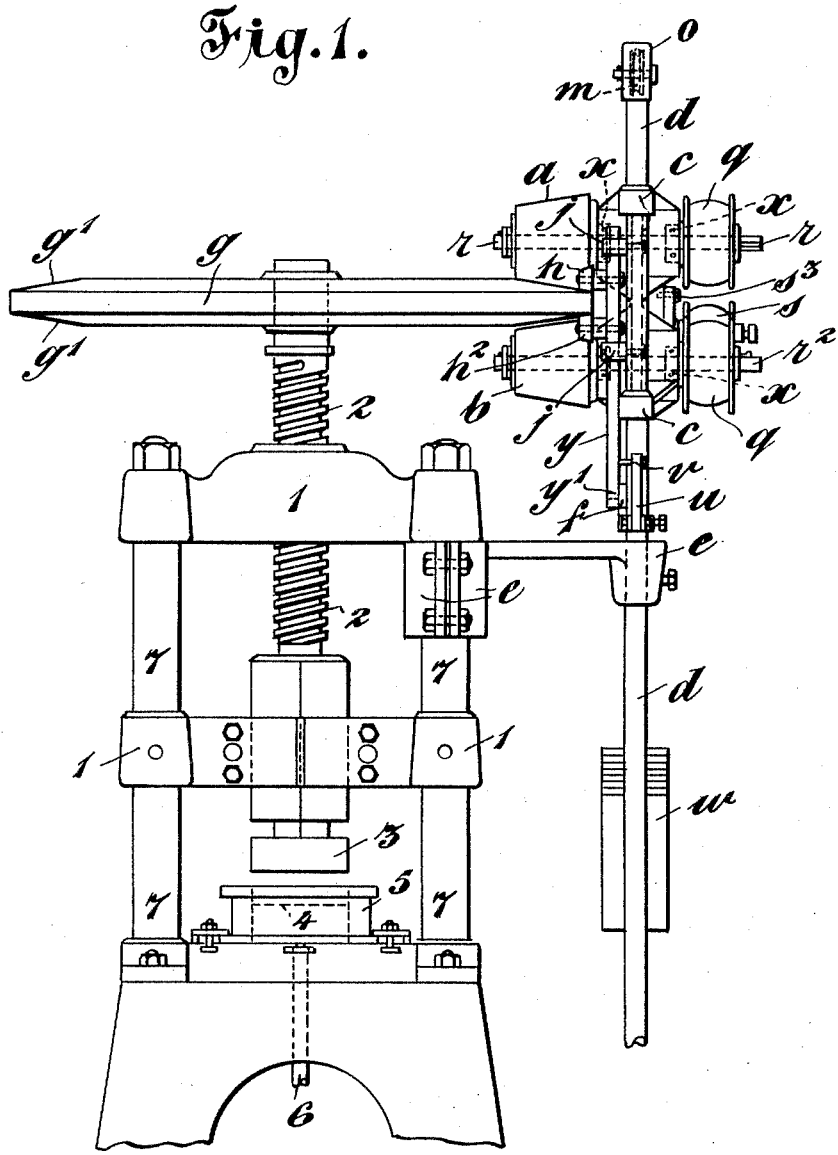

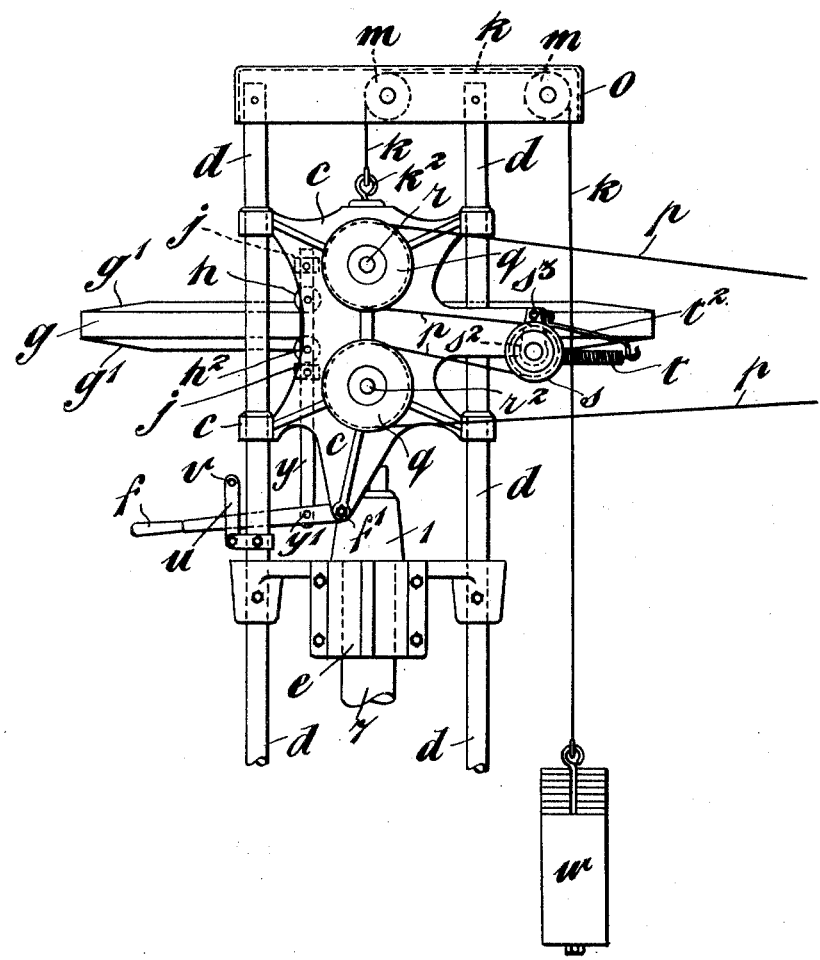

FREDERICK GEORGE GATENSBURY, OF STOKE-ON-TRENT, ENGLAND

DRIVE FOR PRESSES EMPLOYED FOR SHAPING TILES AND OTHER ARTICLES

Application filed March 31, 1930, Serial No. 440,244, and in Great Britain April 18, 1929.

The invention relates to a new or improved drive for presses employed for shaping tiles and other articles, the object being to provide an inexpensive and durable drive which shall be easily operated and controllable and shall be capable of being readily attached to existing or standard screw presses. A further object is to dispense with the heavy overhead gear usually employed on power presses and comprising a horizontal shaft with discs fixed thereon, bearings, and framework necessary to carry same, the discarding of which considerably reduces the height of the press.

The invention consists essentially in a friction drive and control mechanism for screw presses which comprises two driving friction rollers or cones rotatably mounted on a bracket which is slidable on guides or rods fixed to or detachably mounted on a stationary portion of the screw press, said driving friction rollers or cones being arranged to engage alternately the upper and lower faces of the fly wheel, the slidable bracket carrying a link or bar fulcrumed to a hand lever which is pivotally connected to the bracket, the said link or bar being coupled to the fly wheel so as to derive movement therefrom, and a stop for varying the angle of the hand lever to allow the top die to come to rest in its initial position.

The invention will be fully described with reference to the accompanying drawings, which illustrate a screw press for shaping tiles, but it will be understood that my invention is applicable to other forms of screw presses for pressing or shaping other articles.

In the drawings:—

Fig. 1 is a front elevation of a screw press having my invention applied thereto, and Fig. 2 is a side elevation of the press, in which 1 is the frame, 2 is the screw, 3 is the top die, 4 is the bottom die shown dotted in the die box 5, 6 is the lifting rod for the bottom die, and 7 are the vertical pillars of the press, all these parts being of well known construction.

According to my invention I employ two driving friction rollers or cones $a$ and $b$ rotatably mounted on a bracket $c$ which is slidable on guides or rods $d$ fixed to a bracket $e$ bolted to one of the ordinary vertical pillars 7 of the screw press. The lower ends of the guides or rods $d$ may be supported in a casting on the workshop floor or rigidly fixed in any suitable way, the top of the rods $d$ being secured to a cross frame $o$. The slidable bracket $c$ carrying the two driving friction rollers or cones $a$ and $b$ has a link or bar $y$ fulcrumed at $y^1$ to a hand lever $f$, the latter being pivotally connected at $f^1$ to the slidable bracket $c$. The link or bar $y$ is coupled to the fly wheel $g$ by auxiliary rollers or cones $h$ and $h^2$ arranged to engage the top and bottom inclined edges $g^1$ of the fly wheel $g$. The slidable bracket $c$ moves on the link or bar $y$, the latter being guided by lugs $j$ fixed on the bracket $c$.

On one of the guides or rods $d$ is fixed an adjustable bracket $u$ carrying a projection or stop $v$ which is arranged to project over and in the path of the hand lever $f$. When the fly wheel $g$ is being rotated in a direction to lift the top die 3, and the bracket $c$ is also rising (see Fig. 2) and has attained a predetermined height, the hand lever $f$ makes contact with the stop $v$, and as the bracket $c$ continues its upward travel the angle of the hand lever $f$ is increased until the lower friction roller or cone $b$ is brought into contact with the fly wheel $g$, which action gradually retards and slightly reverses the direction of rotation of the fly wheel until it stops in a neutral position, that is to say, clear of the two driving rollers or cones $a$ and $b$, this being the initial position of the top die 3 where it remains until the hand lever $f$ is again operated. It is impossible for the fly wheel $g$ to move downward from this initial position on its own accord, it can only be brought down by pressure on the hand lever $f$.

A cable $k$ or the like is connected at $k^2$ to the slidable bracket $c$ and passes over guide pulleys $m$ on the cross frame $o$, the end of the cable being provided with an adjustable weight $w$ which can be varied to relieve some of the weight of the bracket $c$ and parts thereon so as to regulate or reduce the speed of upward travel of the bracket $c$. The combined weight of the slidable bracket c and the parts carried thereby gives sufficient pressure on the upper roller or cone a to return the top die 3 at a suitable speed to its highest position.

The driving friction rollers or cones a and b are arranged one above the other and at such a distance apart as to engage alternately the top face of the fly wheel g when the top die 3 is to be raised, and the lower face thereof when the top die is to be lowered, this being accomplished by the operation of the hand lever f which will be hereinafter described.

Fig. 1 shows the top die 3 just having left the die box 5 and being raised, the top friction roller or cone a being in rolling contact with the top of the fly wheel g, and the lower friction cone b being clear of the bottom face thereof.

Rotary motion is transmitted to each friction roller or cone a and b by a driving belt p receiving motion from a driving shaft (not shown), said belt p passing over a pulley q carried by each shaft r and $r^2$, the belt p being kept in tension by a small pulley s carried by a swinging or hinged plate $s^2$ pivoted at $s^3$ to the bracket c, the plate $s^2$ being drawn outwards by a tension spring t connected to an arm $t^2$ fixed to the moving bracket c. No matter what may be the position of the slidable bracket c the small pulley s keeps the driving belt p taut. Instead of the driving belt p a driving rope may be arranged over grooved pulleys, or other driving means may be employed.

The driven shafts r and $r^2$ carrying the friction rollers or cones a and b are preferably mounted in ball or anti-friction bearings x.

As illustrated the upper and lower outer surfaces of the fly wheel g are slightly bevelled or inclined at $g^1$ to ensure perfect driving frictional contact of the cones a and b, which have contact surfaces correspondingly inclined.

In some cases an electric motor may be mounted on the slidable bracket c, or on an extension thereof, to transmit the necessary rotary motion to the driving friction rollers or cones a and b.

The machine is operated as follows:—

Assuming that the press is to be used for pressing tiles, and that the top die 3 is in its initial position, the die box 5 is filled with clay dust in the ordinary way. The hand lever f is pressed down, causing the lower friction cone b to engage the lower inclined face $g^1$ of the fly wheel g, rotating and lowering the fly wheel g and consequently lowering the top die 3, which compresses the clay dust to the desired shape of tile. The hand lever f is then released and the top die 3 commences to automatically rise. At this stage a second "bump" may be given by again pressing down the hand lever f. On again releasing the hand lever f the top die 3 automatically rises, this movement being caused by the combined weight of the bracket c and the parts carried thereby bringing the top driving cone a into frictional contact with the upper inclined face $g^1$ of the fly wheel g. The hand lever f, being connected at $f^1$ to the bracket c and fulcrumed at $y^1$ to the link or bar y, moves up bodily until it makes contact with the fixed stop v. As the fly wheel g moves up still further the upward movement of the link or bar y causes the hand lever f to take a greater incline, and consequently raises the bracket c until the lower driving friction cone b makes contact with the lower inclined face of the fly wheel g, this action gradually retarding and slightly reversing the direction of rotation of the fly wheel g, which then stops in a neutral position clear of the two friction cones a and b.

My improved friction drive and control mechanism is applicable to existing screw presses for pressing or shaping tiles and other articles, it being only necessary to substitute for the ordinary fly wheel a fly wheel g having inclined top and bottom surfaces $g^1$, and to bolt the bracket e, carrying the friction drive mechanism, on to one of the ordinary pillars 7 of the press or to any suitable fixed portion of the frame thereof.

I claim:—

1. In mechanism of the character described, a support, a shaft threaded in said support whereby the same is adapted by rotation in one direction to be moved longitudinally in one direction and by rotation in the opposite direction to be moved longitudinally in the opposite direction, a friction disk fixed to said shaft, a carriage mounted for sliding movement in the direction of the axis of said shaft, a pair of drive rollers mounted on said carriage for cooperation with opposite faces of said disk to rotate the same in opposite directions, respectively, a rod slidably mounted on said carriage, a connection between said rod and said disk whereby the rod is movable longitudinally with the disk, a lever pivoted at spaced points to said rod and said carriage, respectively, whereby the same is swingable to shift the carriage to selectively engage either of said rollers with said disk, and a stop device disposed in the path of movement of said lever to be engaged by the latter during movement thereof with the carriage, thereby to swing said lever to shift the carriage thus to automatically effect disconnection of the effective drive roller from the disk.

2. In mechanism of the character described, a support, a shaft threaded in said support whereby the same is adapted by rotation in one direction to be moved longitudinally in one direction and by rotation in the opposite direction to be moved longitudinally in the opposite direction, a friction disk fixed to said shaft, a frame mounted at one side of said shaft and disk for adjustment in the direction of the axis of said shaft, a carriage mounted on said frame for sliding movement with respect thereto in the direction of the axis of said shaft, a pair of drive rollers mounted on said carriage for cooperation with opposite faces of said disk to rotate the same in opposite directions, respectively, a rod slidably mounted on said carriage, a pair of rollers on said rod engaging opposite faces of said disk, respectively, a lever pivoted at an intermediate part to said rod whereby the lever is effective by swinging movement to shift said carriage to selectively engage and disengage said drive rollers with and from said disk, and a stop device adjustably mounted on said frame and disposed in the path of movement of said lever whereby a predetermined amount of sliding movement of the carriage in one direction is effective to automatically swing said lever to disengage the effective drive roller from said disk.

FREDERICK GEORGE GATENSBURY.